US007175053B2

(12) United States Patent
Simon et al.

(10) Patent No.: US 7,175,053 B2
(45) Date of Patent: Feb. 13, 2007

(54) LATERALLY-ACTUATED FLUID DISPENSER DEVICE

(75) Inventors: Bruno Simon, La Haye Malherbe (FR); Giuseppe Stradella, Camogli (IT)

(73) Assignee: Valois S.A., Neubourg (FR)

( * ) Notice: Subject to any disclaimer, the term of this patent is extended or adjusted under 35 U.S.C. 154(b) by 0 days.

(21) Appl. No.: 10/491,575

(22) PCT Filed: Oct. 3, 2002

(86) PCT No.: PCT/FR02/03377

§ 371 (c)(1),
(2), (4) Date: Apr. 5, 2004

(87) PCT Pub. No.: WO03/029105

PCT Pub. Date: Apr. 10, 2003

(65) Prior Publication Data

US 2004/0245291 A1 Dec. 9, 2004

(30) Foreign Application Priority Data

Oct. 4, 2001 (FR) .................................. 01 12772

(51) Int. Cl.
*B67D 5/40* (2006.01)
*G01F 11/00* (2006.01)

(52) U.S. Cl. ...................... 222/162; 222/173; 222/320; 222/321.7; 222/381; 222/383.3

(58) Field of Classification Search ................ 222/162, 222/173, 320, 321.1, 321.7, 321.8, 321.9, 222/381, 383.3
See application file for complete search history.

(56) References Cited

U.S. PATENT DOCUMENTS 3,272,391 A 9/1966 Meshberg
4,771,769 A * 9/1988 Hegemann et al. .... 128/200.22
5,348,194 A * 9/1994 Mascitelli et al. .......... 222/209
5,433,343 A * 7/1995 Meshberg .................... 222/25
5,516,006 A * 5/1996 Meshberg .................... 222/25
5,875,931 A * 3/1999 Py ............................ 222/137
5,899,365 A 5/1999 Eichler et al.
6,305,580 B1 * 10/2001 Chen .......................... 222/162
6,338,422 B1 * 1/2002 DeJonge ..................... 222/162
6,419,124 B1 * 7/2002 Hennemann et al. .... 222/321.6
6,454,135 B1 * 9/2002 Brozell ....................... 222/135

FOREIGN PATENT DOCUMENTS

DE 196 10 456 A 9/1997
FR 1 444 387 A 7/1966
FR 2 671 294 A 10/1992

* cited by examiner

*Primary Examiner*—Joseph A. Kaufman

(74) *Attorney, Agent, or Firm*—Sughrue Mion, PLLC

(57) ABSTRACT

A fluid dispenser device having a fluid reservoir (10), a pump (20) mounted on the reservoir (10) for selectively dispensing the fluid, and a dispenser head (30) connected to the pump and incorporating a dispenser orifice (31). The device includes at least two laterally-actuated elements (40, 50) distributed around the dispenser head (30), the laterally-actuated elements (40, 50) being displaced simultaneously in a direction that is approximately transverse to the central axis of the device, and each co-operating with a peripheral edge (11) of the reservoir (10) so as to exert an axial force thereon.

15 Claims, 1 Drawing Sheet

LATERALLY-ACTUATED FLUID DISPENSER DEVICE

FIELD OF THE INVENTION

The present invention relates to a fluid dispenser device, and more particularly to a laterally-actuated fluid dispenser device.

BACKGROUND OF THE INVENTION

In most fluid dispenser devices, whether in the field of pharmacy, perfumery, cosmetics, or other related fields, the fluid is generally expelled by means of an actuating force acting in axial manner. Particularly with pumps, this force is often exerted by the user pressing a thumb on the bottom of the device and while using other fingers of the same hand to hold the head of the device, which head incorporates the dispenser orifice. That type of dispenser device has a certain number of drawbacks, in particular in the case of nasal applications, since it often creates axial displacement of the whole of the device at the moment of actuation, in particular as a result of the resistance provided by the pump during actuation. The user must apply force to the bottom of the device to achieve said actuation, and, at the moment when said actuation takes place, a fraction of the force is released in such a manner that the arm or the hand of the user may be driven in the same axial direction, which can lead to a risk of injury, in particular when the dispenser orifice is inserted in a nostril.

To remedy that problem, it has been proposed to use laterally-actuated devices in which the user no longer exerts an axial force-on the device, but instead exerts a lateral force transversely to the fluid-dispensing axis, e.g. by means of a button or a pivoting lateral lever, said transverse force being transformed into an axial force. In that known type of laterally-actuated dispenser device, the user holds the device in one hand by gripping the body of the device, or more generally the portion which incorporates the dispenser orifice, a digit, e.g. the thumb, being used to press the laterally-actuated element. Depending on the dispenser device used, in particular depending on the type of pump, or more generally on the type of dispenser means required for expelling the fluid, actuation requires a fairly substantial axial force. Unfortunately, in known laterally-actuated dispenser devices, the radial force exerted by the user is not transformed completely into an axial force enabling actuation, such that the user must press harder on a laterally-actuated device than would be required if exerting pressure axially. The user must thus exert a substantial force, which is not always possible, in particular with children or the elderly, or else actuator means must be provided that are sufficiently large in size to enable transformation to take place easily. However, such as increase in the size of the device often presents a drawback, whether in terms of cost of manufacture or of storage, or even from an ergonomic point of view.

SUMMARY OF THE INVENTION

An object of the present invention is to provide a laterally-actuated fluid dispenser device which does not have the above-mentioned drawbacks.

Another object of the present invention is to provide a laterally-actuated fluid dispenser device which is simple, easy, and cheap to manufacture.

Another object of the present invention is to provide a fluid dispenser device which is simple to use and reliable.

The present invention therefore provides a fluid dispenser device comprising a fluid reservoir, a pump mounted on the reservoir for selectively dispensing the fluid, and a dispenser head connected to said pump and incorporating a dispenser orifice, said device being characterized in that it includes at least two laterally-actuated elements distributed around said dispenser head, said laterally-actuated elements being displaced simultaneously in a direction that is approximately transverse to the central axis of the device, and each co-operating with a peripheral edge of said reservoir so as to exert an axial force thereon.

Each laterally-actuated element is advantageously secured to said dispenser head.

Each laterally-actuated element is advantageously made in the form of an elastically deformable lever, firstly connected to the dispenser head, and secondly co-operating with the peripheral edge of the reservoir.

Each laterally-actuated element preferably has a cam surface co-operating with the bottom edge of the reservoir.

The cam surface is advantageously a sloping plane having a slope that varies during displacement of the actuator elements, said slope being at a maximum at the start of actuation and at a minimum at the end of actuation so that the radial force exerted by the user on the actuator elements is transformed into axial force for displacing the reservoir that is at a maximum at the end of actuation.

After actuation, said laterally-actuated elements advantageously return resiliently to their rest position.

After actuation, said laterally-actuated elements are advantageously returned to their rest position by the reservoir returning to its respective rest position.

Said peripheral edge of said reservoir is advantageously the bottom peripheral edge.

Said device advantageously includes two laterally-actuated elements that are diametrically opposite each other relative to said dispenser head.

BRIEF DESCRIPTION OF THE DRAWINGS

Other characteristics and advantages of the present invention appear more clearly from the following detailed description of a particular embodiment thereof, made with reference to the accompanying drawing, and given by way of non-limiting example, in which.

DETAILED DESCRIPTION OF EXEMPLARY EMBODIMENTS

Figure 2:
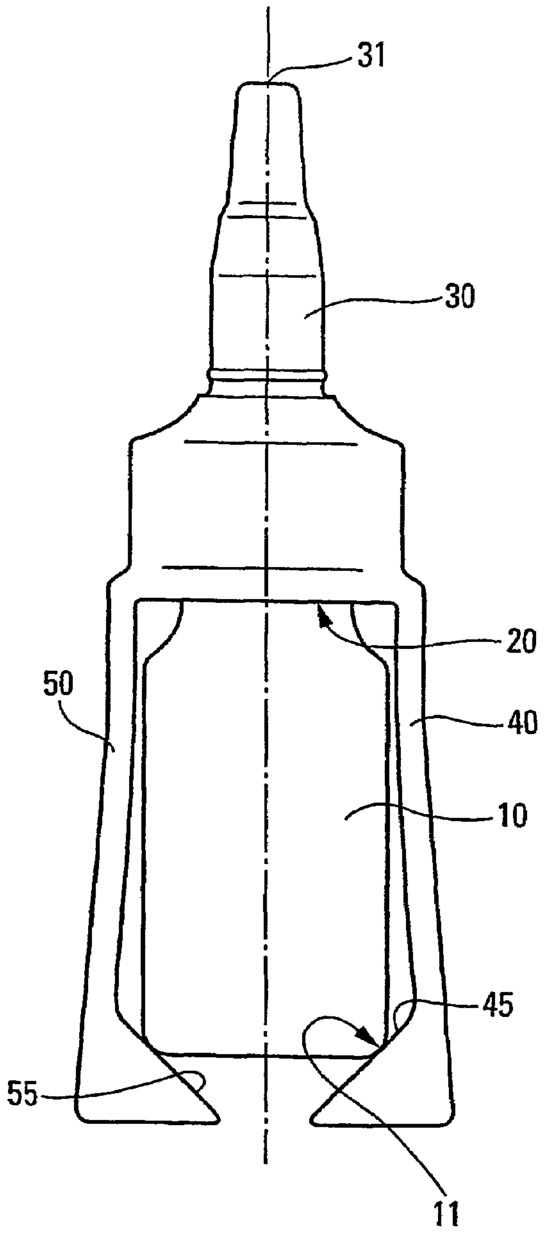
FIG. 2 is a view similar to that of FIG. 1, in the actuated position of the device.

The present invention applies to multiple-dose dispenser devices, i.e. comprising a reservoir containing a plurality of doses, a pump being mounted on said reservoir for selectively dispensing the fluid contained therein. In the figures, the pump is not shown in detail. A precompression pump, comprising one or more pistons sliding in a pump chamber, can be used to dispense the fluid contained in the multiple-dose devices. Dispensing is thus achieved by axially displacing the reservoir relative to the portion of the pump which performs the actuation, and which is generally secured to the dispenser head.

Thus, with reference to the figures, the device comprises a reservoir 10 containing a plurality of doses of fluid, a pump 20 mounted on said reservoir 10, and a dispenser head 30 connected to said pump 20 and incorporating a dispenser orifice 31. The device is actuated by axially displacing the dispenser head 30, which is connected to the pump 20, relative to the reservoir 10.

In general, said axial displacement is achieved by applying an axial force to the bottom of the reservoir 10. The present invention provides for lateral actuation, thereby preventing any risk of the device being displaced axially while in use, which can be particularly uncomfortable in a nasal-type dispenser device, as shown in the drawing. Lateral actuation prevents the user from applying axial force to the device, and therefore guarantees axial stability of the device during actuation.

In the invention, the device includes at least two laterally-actuated elements. As shown in the drawing, there are preferably two laterally-actuated elements 40, 50 that are diametrically opposite each other about the dispenser head 30. The two laterally-actuated elements 40, 50 are preferably connected directly to said dispenser head 30, and in particular they are formed integrally as a single piece with said dispenser head. As shown in the figures, each laterally-actuated element 40, 50 can be made in the form of a lever or a wing which extends approximately along the side wall of the reservoir 10. Each of the laterally-actuated elements preferably has a cam surface 45, 55 adapted to co-operate with a peripheral edge 11 of the reservoir 10. The peripheral edge is preferably the bottom edge of the reservoir. As can be seen in the figures, the cam surface is advantageously made in the form of a sloping plane which, during any actuating process, co-operates with the same point on the reservoir 10, i.e. the outside bottom edge 11 of said reservoir in the example shown.

Figure 1:
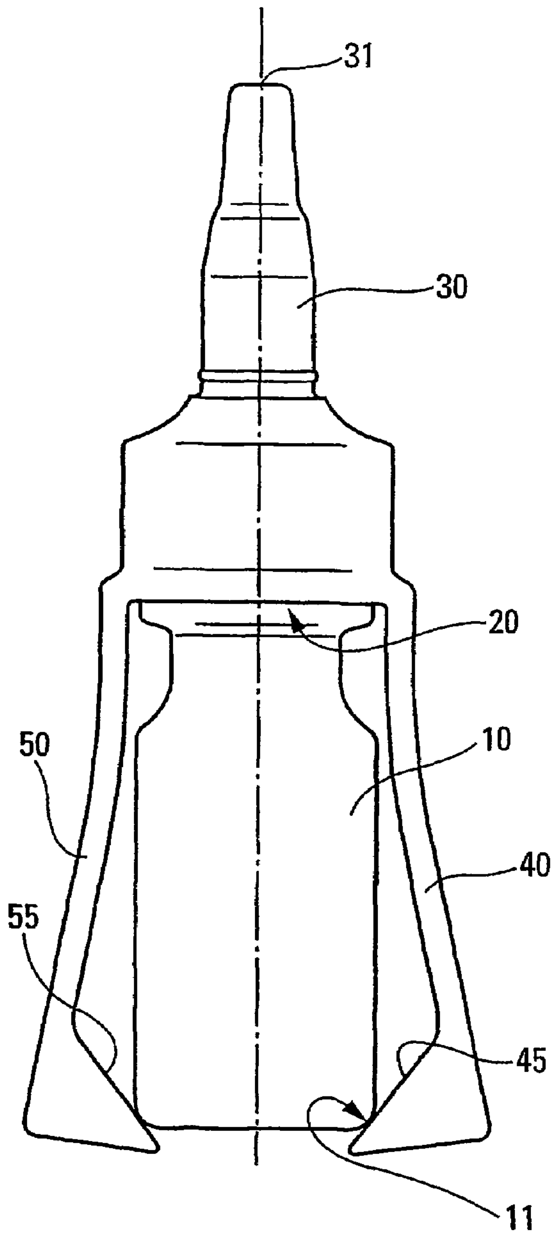
FIG. 1 is a diagrammatic cross-section view of a fluid dispenser device of the present invention, in the rest position.

The use of a sloping plane as a cam surface in a laterally-actuated element pivoting on the dispenser head 30 provides an advantage in that the slope of the cam surface 45, 55 of each laterally-actuated element varies during actuation of the device. Thus, as can be seen in FIG. 1, which shows the rest position, the slope is at a maximum at the start of actuation, thereby signifying that the transformation of the radial force exerted by the user on the levers or the wings 40, 50 is smaller, while at the end of actuation, as shown in FIG. 2, the slope of the cam surface 45, 55 is reduced, so that the transformation of radial force into axial force for actuating the reservoir 10 is larger. This is advantageous because in a pump, and in particular in a precompression pump, resistance increases during the actuating stroke, and the resistance of the pump reaches its maximum at the end of actuation, just before dispensing. The user must then exert an increasing force so as to be able to actuate the device. In the present invention, the variation of the slope of the cam surface of each laterally-actuated element makes it possible to overcome this drawback, and in particular makes it possible to actuate the device by exerting an approximately constant force during the entire actuation process.

An essential advantage of the present invention consists in simultaneously using two or more actuator elements distributed around the device. This makes it possible to reduce the force required to actuate the device, thereby making it easier to use for the elderly or for children, or more generally for any weak person. Furthermore, the presence of two or more laterally-actuated elements is more ergonomic and improves safety in use. When the user simultaneously exerts the same force on the laterally-actuated elements, the device is not subjected to any radial stress during actuation and therefore does not risk being displaced in a radial direction, as can be the case with a laterally-actuated device in which the user presses only one laterally-actuated element. Furthermore, exerting the same radial force on the laterally-actuated elements implies that the reservoir is not subjected to any radial stress when it is displaced axially. There is therefore no risk of leakage at the piston of the pump during said actuation, which might otherwise result from said reservoir being slightly offset radially. The use of two or more laterally-actuated elements, which makes it possible to reduce the actuating force required to perform the actuation, also makes it possible to reduce the dimensions of the device. Even a cam-surface slope that is relatively steep at the start of actuation is sufficient to enable the axial displacement of the reservoir, and thus enable the fluid to be dispensed.

Although the present invention is described with reference to a particular embodiment thereof and with reference to the drawing, the invention is, naturally, not limited to said embodiment. In particular, the device can include more than two laterally-actuated elements, e.g. three or four, distributed around the device. In addition, the peripheral edge with which each of the laterally-actuated elements co-operates is not necessarily the bottom edge, nor is it necessarily formed by a sharp edge, but alternatively could be a sloping edge corresponding to the cam surface of the actuator element. Other modifications can also be made by the person skilled in the art without going beyond the ambit of the present invention, as defined by the accompanying claims.

The invention claimed is:

1. A nasal fluid dispenser device comprising a fluid reservoir (10), a pump (20) mounted on the reservoir (10) for selectively dispensing the fluid, and a nasal dispenser head (30) structured to be inserted into the nasal passage, the nasal dispenser head connected to said pump and incorporating a dispenser orifice (31), said device being characterized in that it includes at least two laterally-actuated elements (40, 50) distributed around said nasal dispenser head (30), said laterally-actuated elements (40, 50) being displaced simultaneously in a direction that is approximately transverse to the central axis of the device, and each co-operating with a bottom peripheral edge (11) of said reservoir (10) so as to exert an axial force thereon; and wherein the laterally-actuated elements are formed as a one-piece integral construction with the dispenser head.

2. A device according to claim 1, in which each laterally-actuated element (40, 50) is secured to said nasal dispenser head (30).

3. A device according to claim 1, in which each laterally-actuated element (40, 50) is made in the form of an elastically deformable lever, firstly connected to the nasal dispenser head (30), and secondly cooperating with the peripheral edge (11) of the reservoir (10).

4. A device according to claim 1, in which each laterally-actuated element (40, 50) has a cam surface (45, 55) co-operating with the bottom edge (11) of the reservoir (10).

5. A device according to claim 4, in which the cam surface (45, 55) is a sloping plane having a slope that varies during displacement of the actuator elements (40, 50), said slope being at a maximum at the start of actuation and at a minimum at the end of actuation so that the radial force exerted by the user on the actuator elements (40, 50) is transformed into axial force for displacing the reservoir (10) that is at a maximum at the end of actuation.

6. A device according to claim 1, in which, after actuation, said laterally-actuated elements (40, 50) return resiliently to their rest position.

7. A device according to claim 1, in which, after actuation, said laterally-actuated elements (40, 50) are returned to their rest position by the reservoir (10) returning to its respective rest position.

8. A device according to claim 1, in which said device includes two laterally-actuated elements (40, 50) that are diametrically opposite each other relative to said nasal dispenser head (30).

9. The device according to claim 1, wherein simultaneous actuation of the two laterally-actuated elements results in substantially no transverse force on the fluid reservoir.

10. The device according to claim 1, wherein the laterally-actuated elements are structured so that, upon simultaneously displacing the laterally-actuated elements in a direction that is approximately transverse to the central axis of the device when dispensing fluid into a nostril, no axial force and no transverse force is applied to the dispenser head inside the nostril.

11. The device according to claim 1, wherein the dispenser head extends along the central axis of the device such that, upon actuation of the laterally-actuated elements, nasal fluid is expelled from the dispenser head along the central axis of the device.

12. A nasal fluid dispenser device, comprising:

a fluid reservoir containing a fluid;

a pump mounted on the reservoir for dispensing the fluid;

a nasal dispenser head structured to be inserted into the nasal passage, the nasal dispenser head connected to the pump and comprising a dispenser orifice; and two laterally-actuated elements on opposite sides of the nasal dispenser head, the laterally-actuated elements are actuated in a direction that is substantially transverse to an axial direction of the device, each laterally-actuated element co-operating with a lower edge of the reservoir so as to exert an axial force on the reservoir; and wherein the two laterally-actuated elements are formed as a one-piece integral construction with the dispenser head.

13. The nasal fluid dispenser according to claim 12, wherein simultaneous actuation of the two laterally-actuated elements results in substantially no transverse force on the fluid reservoir.

14. The nasal fluid dispenser according to claim 12, wherein the two laterally-actuated elements are structured so that, upon simultaneously displacing the laterally-actuated elements in a direction that is approximately transverse to the axial direction of the device when dispensing fluid into a nostril, no axial force and no transverse force is applied to the dispenser head inside the nostril.

15. The device according to claim 12, wherein the dispenser head extends along the axial direction of the device such that, upon actuation of the two laterally-actuated elements, fluid is expelled from the dispenser head along the axial direction of the device.

* * * * *